Figure 1:
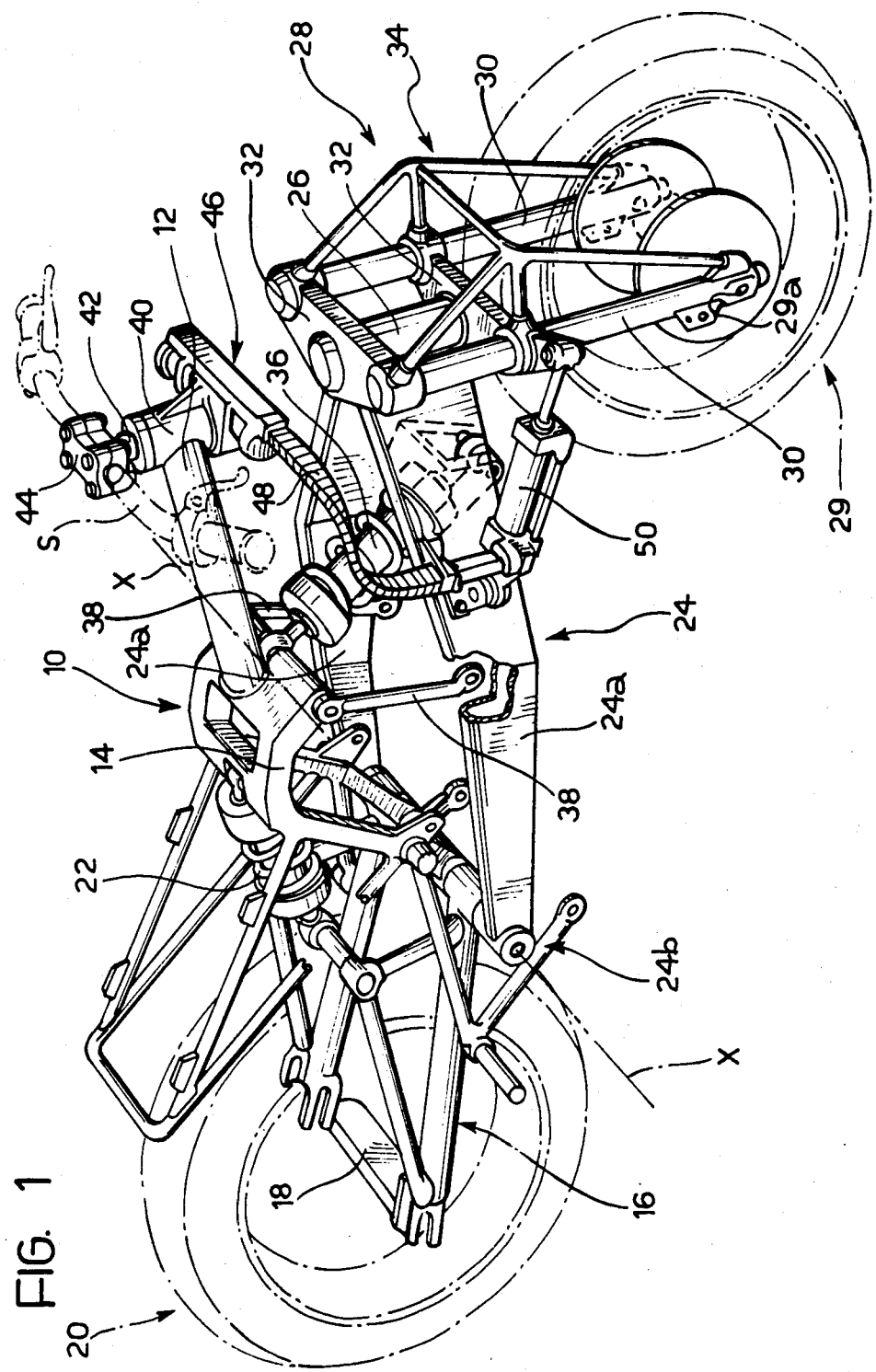

United States Patent [19]

Roatta

[11] Patent Number: 4,744,579
[45] Date of Patent: May 17, 1988

[54] MOTORCYCLE WITH SINGLE-SHOCK-ABSORBER, FRONT SUSPENSION

[76] Inventor: Renato Roatta, Frazione Prale 35, 12078 Ormea (Cuneo), Italy

[21] Appl. No.: 58,723

[22] Filed: Jun. 5, 1987

[51] Int. Cl.⁴ .................... B62K 19/00; B62K 21/00; B62K 25/00
[52] U.S. Cl. .................................. 280/275; 180/219; 180/227; 280/276; 280/283; 280/284
[58] Field of Search ............... 180/219, 227, 211, 311, 180/312, 313, 228; 280/276, 277, 279, 280, 281 R, 270, 92, 275, 283, 284; D12/110, 111, 112, 113

[56] References Cited

U.S. PATENT DOCUMENTS 3,722,612   3/1973   Issigonis et al. ............... 280/275 X

FOREIGN PATENT DOCUMENTS 2583704  12/1986  France ................. 180/227
523565   4/1955   Italy ..................... 280/277
299694   8/1965   Netherlands ......... 180/227

*Primary Examiner*—John J. Love
*Assistant Examiner*—Mitchell J. Hill
*Attorney, Agent, or Firm*—Sughrue, Mion, Zinn, Macpeak and Seas

[57] ABSTRACT

The axle of the front wheel of a motorcycle is carried on a pivotable member articulated about the same axis of articulation as the pivotable fork which supports the rear wheel. Single shock-absorbers are interposed between the frame and the rear fork and between the frame and the front pivotable member respectively.

6 Claims, 2 Drawing Sheets

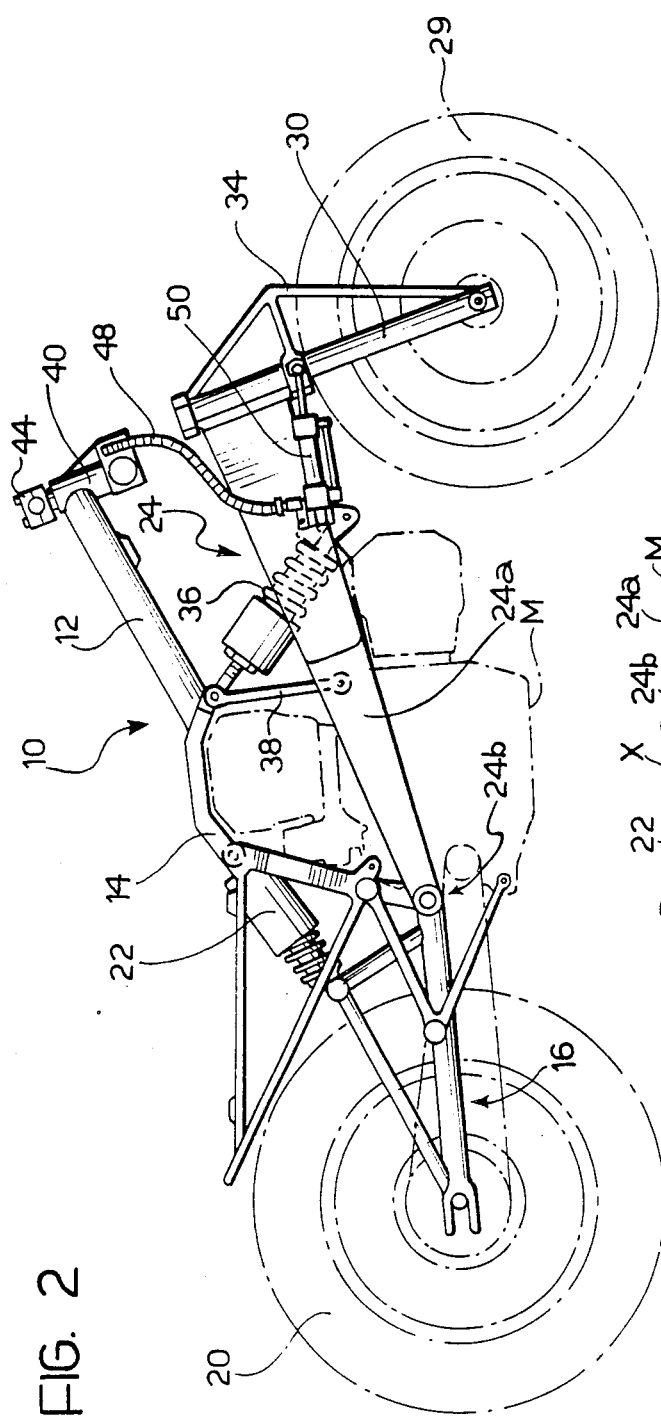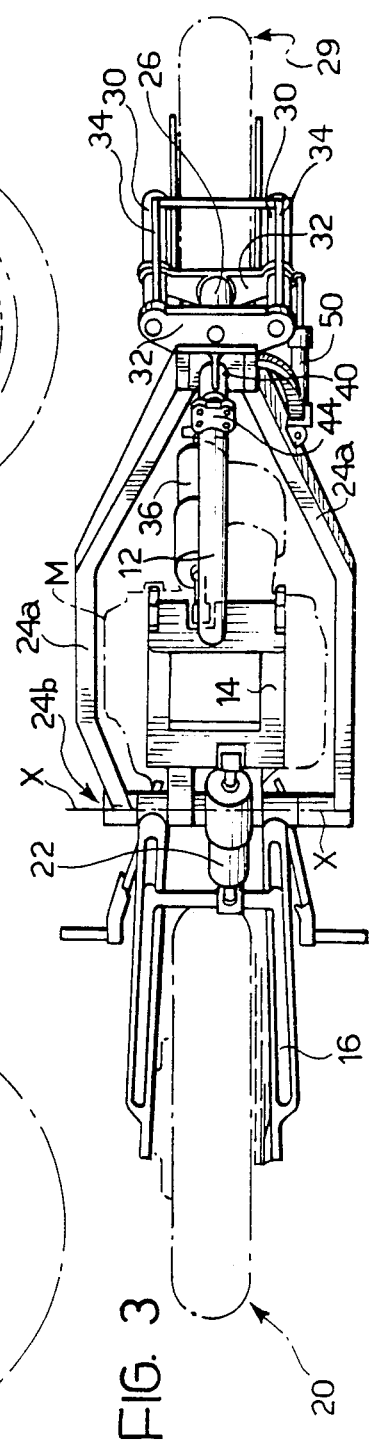
FIG. 2
FIG. 3

MOTORCYCLE WITH SINGLE-SHOCK-ABSORBER, FRONT SUSPENSION

The present invention relates to a motorcycle of the type having a frame to which is articulated a pivotable fork which extends rearwardly and supports the rear-wheel axle and to which is articulated a pivotable member which extends forwardly and supports the front-wheel, axle shock-absorber means being interposed between the pivotable fork and the frame and between the pivotable member and the frame.

Motorcycles of the above type have been produced to avoid inconveniences arising, in the use of a telescopic fork, with regard to road-holding and manoeuvrability. The current construction of these motorcycles is complex, expensive and heavy.

The object of the present invention is to provide a motorcycle which does not have the above inconveniences and which is comparable, in terms of simplicity and economy of production, to a motorcycle having a classic, telescopic front fork, whilst not having its faults.

This object is achieved by virtue of the fact that the pivotable fork and the pivotable member are articulated about a single, common axis.

The pivotable member conveniently comprises a steering column which rotatably houses a steering tube of a rigid fork which supports the front-wheel axle.

By virtue of these characteristics, the precision with regard to steering and braking on bends and during acceleration, is considerably improved.

Preferably, the pivotable member is substantially V-shaped, its ends being articulated to the frame and its vertex being attached to the steering column.

By virtue of this configuration, the engine block can conveniently be accommodated within the pivotable member, which, by virtue of its conformation, has considerable rigidity.

Further advantages and characteristics of the motor cycle of the invention will be seen from the detailed description below, provided purely by way of non-limiting example, with reference to the appended drawings, in which:

FIG. 1 is a perspective view of the motorcycle according to the invention without the superstructure and the engine, FIG. 2 is a side view of the motorcycle of FIG. 1, and FIG. 3 is plan view of the motorcycle of FIG. 1.

With reference to the drawings, a motorcycle frame indicated 10 includes a tubular member 12 attached at one end to a central portion 14.

The central portion 14 of the frame 10 is articulated to a pivotable rear fork 16 supporting an axle 18 for the rear wheel 20. A single shock-absorber 22 is interposed in known manner between the pivotable fork 16 and the portion 14 of the frame.

Articulated to the frame 10, outside the fork 16, is a pivotable member 24 whose axis of articulation, indicated X—X in the drawings, coincides with the axis of articulation of the pivotable fork 16. The pivotable member 24 which is, for example, of sheet-metal box-section construction, is substantially V-shaped and has two arms 24a whose ends 24b are articulated to the frame 10 and which converge towards a steering column 26 in which a tube associated with a rigid fork 28 is rotatably mounted. The fork 28 supports the axle 29a of the front wheel 29 and has shafts 30 connected to each other and to the tube by means of plates 32 to which stiffening members generally indicated 34, are also connected. A single shock-absorber 36, similar to the single shock-absorber 22, is interposed between the pivotable member 24 and the frame 10.

An engine assembly M, illustrated in broken outline in FIGS. 2 and 3 is situated in the space between the two arms 24a of the pivotable member 24 and is supported by arms 38 attached to the central portion 14 of the frame 10; the end of the tubular member 12 not fixed to the frame 10 is welded to a tubular mount 40 of the steering gear which rotatably houses a pin 42 attached at its upper end to a clamp 44 for the attachment of handlebars S, indicated in broken outline in FIG. 1, and at its lower end to a hydraulic distributor 46. The hydraulic distributor 46, through a flexible line 48, controls a hydraulic ram 50 interposed between an arm 24a and a shaft 30 of the rigid fork 28. The rigid fork 28 can be rotated about the steering column 26 by rotating the pin 42 by means of the handlebars S and the clamp 44.

It is clear that the scope of the present invention extends to models which achieve equal utility by using the same innovative concept.

For example, either the pivotable member 24 or the pivotable fork 16 can, to advantage, be articulated to the engine block M which, in this case would act as a support.

What is claimed is:

1. A motor cycle of the type having a frame; a fork pivotally attached to said frame and extending rearwardly to support the rear-wheel axle; a member pivotally attached to said frame and extending forwardly to support the front-wheel axle; and shock-absorber means interposed between said fork and said frame and between said member and said frame, said fork and said member are pivoted about a common axis.

2. A motorcycle as claimed in claim 1, wherein said pivotable member includes a steering column which rotatably supports a rigid fork for accommodating the front wheel.

3. A motorcycle as claimed in claim 2, wherein said pivotable member has two arms connected in a V-shape, the free ends of the arms being pivotally attached to said frame and the vertex of said V-shape being fixed to said steering column.

4. A motorcycle as claimed in claim 2, wherein said pivotable member and said pivotable fork are articulated to said frame of said motorcycle which acts as a support.

5. A motorcycle as claimed in claim 2, wherein a pressurised fluid ram is interposed between said pivotable member and a shaft of said rigid fork and a hydraulic distributor associated with the steering gear is arranged to control said ram to allow indirect steering of the front wheel.

6. A motorcycle as claimed in claim 3, wherein said free ends of said arms of the pivotable member are pivotally attached to said frame outside said pivotable fork.

* * * * *